Dec. 6, 1966 C. R. BROWN 3,289,533
MISSILE LAUNCHING TUBE SEAL
Filed April 6, 1965 2 Sheets-Sheet 1
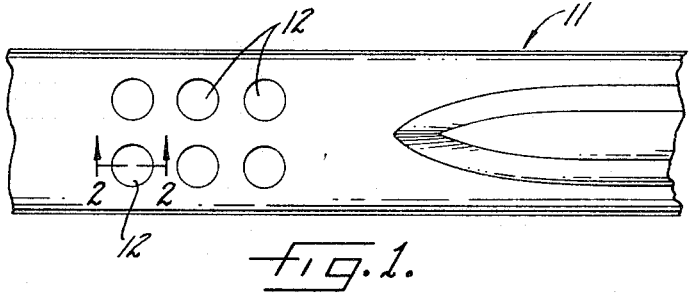
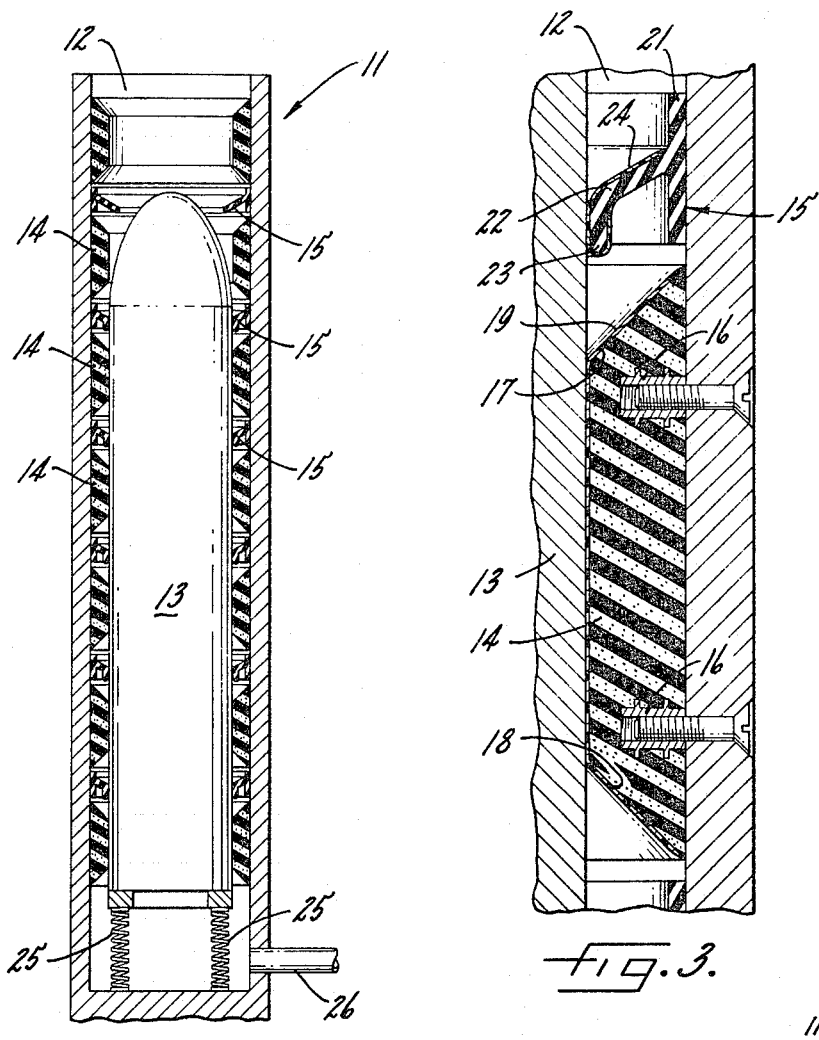
INVENTOR.
Charles R. Brown,
BY
H. H. Loscke
Paul S. Collignon ATT'YS.

Dec. 6, 1966  C. R. BROWN  3,289,533
MISSILE LAUNCHING TUBE SEAL
Filed April 6, 1965  2 Sheets-Sheet 2

INVENTOR.
Charles R. Brown,
BY
H. H. Losch
Paul S. Collignon ATT'YS.

United States Patent Office 3,289,533
Patented Dec. 6, 1966

3,289,533
MISSILE LAUNCHING TUBE SEAL
Charles R. Brown, Sunnyvale, Calif., assignor, by mesne assignments, to the United States of America as represented by the Secretary of the Navy
Filed Apr. 6, 1965, Ser. No. 446,138
1 Claim. (Cl. 89—1.810)

The present invention relates to a sealing device for a missile launching tube and more particularly to a sealing device for use in a submergible, vertically oriented missile launching tube.

Recent developments in submarine missile warfare has seen the advent of launching missiles while the submarine is submerged. As some of the missiles are several feet in diameter, it is not practical to hold the outside diameter dimensions to close tolerances, and therefore the inner diameter of the launching tube is made considerably larger than the outside diameter of the missile to be launched therefrom. In order to prevent damage to the missile while the missile is within the launching tube, it is necessary to support or cushion the missile in a lateral direction.

Heretofore, in naval missiles, a plurality of rubber adapter blocks are loosely pinned to the outside skin of the missile and fit between the side of the missile and the wall of the launching tube. As the missile is launched from the tube, the rubber adapter blocks slide out of the launching tube and separate from the missile. There are, however, several disadvantages to using these rubber adapter blocks. These blocks have been known to come unpinned while the missile is still within the launching tube thereby causing damage to the missile skin. Also, these adapter blocks have frequently fouled or jammed the hatch on the launching tube so that the hatch could not be closed after the launch.

The present invention relates to a launching tube that is provided with a combination seal that functions as a shock and vibration protector and also seals to prevent leakage of ejection gas during the launch. A plurality of annular seals of soft resilient material are provided to cushion the missile within the launching tube and alternate layers of stiffer elastomeric seals are provided to minimize leakage of ejection gas during the launch. In order to minimize friction when the missile is moving relative to the seals, the annular seals of resilient material and the elastomeric seals are all provided with a coating of low friction material, such as Teflon.

It is therefore a general object of the present invention to provide an improved launching tube for launching a missile.

Another object of the present invention is to provide an improved missile launching tube having means for supporting a missile in a lateral direction.

Still another object of the present invention is to provide an improved missile launching tube for guiding a missile during launch.

A further object of the present invention is to provide a launching tube that has improved sealing means for minimizing leakage of gas during the ejection cycle of the missile.

Other objects and advantages of the present invention will be readily appreciated as the same becomes better understood by reference to the following detailed description when considered in connection with the accompanying drawing wherein:

FIGURE 1 is a schematic plan view of a submarine hull showing a possible arrangement of vertical launching tubes arranged therein;

FIGURE 2 is a partial sectional view taken on line 2—2 of FIGURE 1 and showing a missile within a launch tube;

FIGURE 3 is an enlarged sectional view of a portion of FIGURE 2 showing sealing details;

Figure 4:
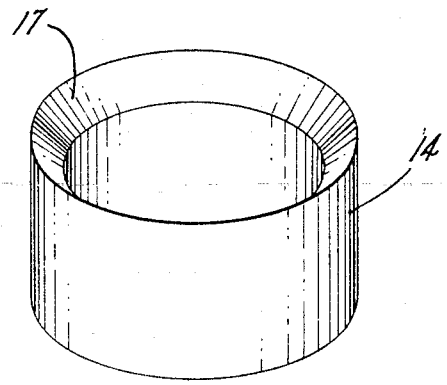
FIGURE 4 is a perspective view showing a resilient support.
Figure 5:
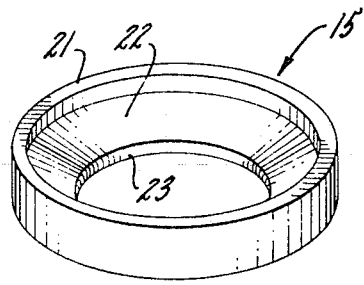
FIGURE 5 is a perspective view showing an elastomeric seal.

Referring now to the drawings, wherein like reference characters designate like or corresponding parts throughout the several views, there is shown in FIGURE 1 a portion of a submergible ship hull 11 that is provided with a plurality of vertically extending launching tubes 12. As best shown in FIGURE 2 of the drawings, the dimension of the outside diameter of a missile 13 to be launched is somewhat less than the dimension of the inside diameter of the launch 12 and, unlike many projectiles that require a line to line fit within a chamber or bore, the tolerances on the outer dimension of missile 13 are not extremely critical.

Referring particularly to FIGURES 2 through 6 of the drawings, each launching tube 12 is provided with a plurality of lateral supports 14 and a gas seal 15 is provided between adjacent lateral supports. By way of example, FIGURE 2 of the drawings shows seven lateral supports 14 being provided and six gas seals 15, however, a greater or lesser number of supports and seals could be employed without detracting from the invention.

Lateral supports 14, which are shown in FIGURES 2, 3, and 4 of the drawings to be annular, are preferably made of a soft resilient material and are securely fastened to the inner diameter of the launching tube 12. By way of example, supports 14 can be secured to the inner diameter by cementing or by means of mechanical fasteners 16. The ends of each lateral support 14 are provided with a sloping or tapered portion, as shown by numbers 17 and 18 on the drawings, and these tapered portions serve to facilitate movement of the missile during loading and launch, in that there are no sharp corners to wedge or break-off. The inner portion of supports 14 that comes into contact with the outer surface of missile 13 is provided with a covering of low friction material 19, such as polytetrafluoroethylene. While the drawings show supports 14 to be annular in configuration, as supports 14 are not relied upon for sealing, it should be understood that supports 14 could be segments of a cylinder.

Figure 6A:
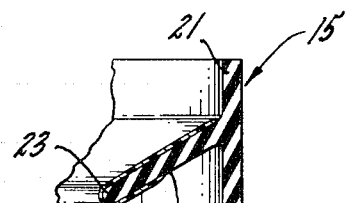
FIGURE 6(a) is a sectional view showing an elastomeric seal in an uncompressed position.
Figure 6B:
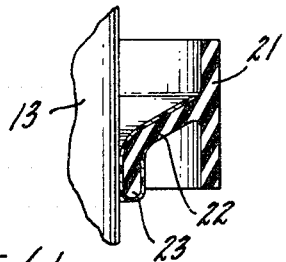
FIGURE 6(b) is a sectional view showing an elastomeric seal in a compressed and sealing relationship with a missile.

A plurality of elastomeric seals 15 are provided, there being one seal positioned between adjacent lateral supports 14. Each elastomeric seal 15 is provided with a cylindrical portion 21 that is fastened to the inner diameter of the launching tube 12 by means of cement or mechanical fasteners. An annular lip 22 extends angularly downward from cylindrical portion 21 and extends in a direction toward the center of launching tube 12. The angular slope and length of each lip 22 is such that the diameter of the bottom edge 23 is less than the outside diameter of the missile 13 to be positioned in launching tube 12. As best illustrated in FIGURES 6(a) and 6(b) of the drawings, missile 13 will bend or bias lip 22, and thus seal 15 will help prevent escapement of the gas being used to eject missile 13, until missile 13 clears launching tube 12. In order to minimize the effect of friction during the time of launch, when missile 13 is moving relative to seals 15, a covering of low friction material 24, such as polytetrafluoroethylene is provided on each lip 22.

In operation, missiles 13 are loaded ito the launching tubes 12 and the bottoms of missiles 13 are supported on resilient means, such as springs 25. Supports 14 cushion the missiles in a lateral direction and protect them from adverse shocks and vibrations. The actual launching of missile 13 commences with the introduction of high pressure ejection gas into tube 12 through pipe 26. Seals 15 will prevent the escapement of the ejection gas from around the sides of the missile and the missile will travel upward and out of the launching tube 12.

It can thus be seen that the combination seal of the present invention provides shock and vibration protection to the missile prior to launch and during the time of launch, and also it can be seen that the seal prevents the escapement of the ejection gas during launch.

Obviously many modifications and variations of the present invention are possible in the light of the above teachings. It is therefore to be understood that within the scope of the appended claim the invention may be practiced otherwise than as specifically described.

What is claimed is:

A submergible missile launching device comprising: a vertically oriented missile launching tube, a plurality of annular supports of resilient material spaced apart from one another and securely attached to the inner wall surface of said launching tube, and a plurality of annular elastomeric seals positioned between adjacent annular supports for providing a fluid seal between the inner wall surface of said launching tube and a missile to be launched therefrom, each said annular elastomeric seal being comprised of a cylindrical portion and an annular lip extending downwardly and outwardly from said cylindrical portion, said cylindrical portion being securely attached to said inner wall surface of said launching tube.

References Cited by the Examiner
UNITED STATES PATENTS

| 3,023,704 | 3/1962 | Dawson et al. | 102—94 |
| 3,124,040 | 3/1964 | Fiedler | 89—1.7 |
| 3,166,978 | 1/1965 | Price et al. | 89—1.7 |

References Cited by the Applicant
UNITED STATES PATENTS

| 3,003,560 | 10/1961 | Corley et al. |
| 3,100,421 | 8/1963 | Moy. |
| 3,135,163 | 6/1964 | Mechlin et al. |

BENJAMIN A. BORCHELT, *Primary Examiner.*

SAMUEL W. ENGLE, *Examiner.*